Feb. 16, 1960 L. JONES Re. 24,785

COLLAPSIBLE BOTTLE CARRIER

Original Filed March 22, 1955

INVENTOR:
Llewellyn Jones
BY
W. J. Stevenson

United States Patent Office

Re. 24,785
Reissued Feb. 16, 1960

24,785

COLLAPSIBLE BOTTLE CARRIER

Llewellyn Jones, Southgate, Calif., assignor to Strongcraft Products, Inc., Los Angeles, Calif., a corporation of California Original No. 2,784,870, dated March 12, 1957, Serial No. 495,877, March 22, 1955. Application for reissue June 20, 1958, Serial No. 745,790

5 Claims. (Cl. 220—110)

Matter enclosed in heavy brackets [ ] appears in the original patent but forms no part of this reissue specification; matter printed in italics indicates the additions made by reissue.

This invention relates generally to carriers or portable racks and particularly to an improved wire rack employed for carrying a plurality of bottles.

Various forms of racks are currently used for transporting liquid containers, such as milk bottles. One rack commonly in use consists of a rigid wire structure having upper and lower, rectangular, wire frames joined by upright wires. The upper frame has crossing wires which define compartments for receiving the milk bottles which rest upon wires of the bottom frame. The rack is provided with an upstanding, inverted U-shaped, wire bail or handle, the several wire parts being welded together in a rigid structure. Such conventional wire carriers are used by persons purchasing milk at dairies, the full bottles being placed in the rack at the dairy to be conveniently transported by the purchaser to his home. When the milk has been used, the empty bottles are placed in the rack to be returned to the dairy. Such wire racks are frequently loaned or sold by the dairies to their customers. Since the dairies may be of small area, storing of the racks therein may present a space problem, stacking of the rigid, non-collapsible racks being practically impossible. A similar problem exists when shipping the racks from the manufacturing plant where they are made.

It is therefore an object of this invention to provide a compartmented wire rack or carrier for transporting bottles, the rack being so constructed that a plurality of the racks may be stacked, and also collapsed into a relatively flat condition so that a large number of the flattened racks may be placed one upon another in a shipping carton or within a relatively small storage space in a dairy, store or delivery truck.

Another object of the invention is to provide a wire rack, of the character referred to, which consists of a lower frame, an upper frame, having crossing wires forming compartments for receiving the bottles, which, when so placed in the rack or carrier, rest upon the lower frame, and upright wires having their upper and lower ends pivotally connected respectively to the upper and lower frames to adapt the frames to be moved toward each other to collapse the structure and to be spread apart into normal extended position. According to the present concept, the wire carrier also includes an inverted U-shaped bail or handle, the lower ends of the legs of which are provided with hooks adapted for engagement in part-loops, formed in the end wires of the lower frame, intermediate portions of said legs being adapted to snap into similar half-loops provided in the end wires of the upper frame. By this provision, when the legs of the handle are engaged with the upper and lower frames, the handle provides a locking means by which pivotal movement of the upright wires is prevented and the carrier is thus maintained rigid in its extended, operative state. On the other hand when the handle is disengaged from the frames, the structure may be collapsed by pivoting the uprights to a substantially horizontal position with the handle also assuming a similar, substantially horizontal position, the rack thus being converted to a flat structure so as to reduce it to a small size.

Another object of the invention is to provide a wire rack, holder or carrier of the class specified in which the upper frame is provided with cross members or separators which divide the area of the frame into a plurality of compartments for receiving the milk bottles. According to the present concept, the cross members have parallel wires extending lengthwise of the rack and defining between them a longitudinal slot or opening. By this provision, a rack may be placed upon a second rack with its bottom frame resting upon the top frame of the lower rack, the handle of the lower rack then extending upwardly through the slot of the upper rack to nest within the handle of the upper rack. Thus, by this means the racks may be stacked, one upon another, even though their handles project upwardly from the structure.

A further object of the invention is to provide a bottle rack or carrier which is of simple wire construction adapted for economical manufacture, one which is light in weight, and durable in use, and highly efficient in performing its intended function.

Further objects will appear from the following description and from the drawing which is intended for the purpose of illustration only, and in which.

Figure 1:
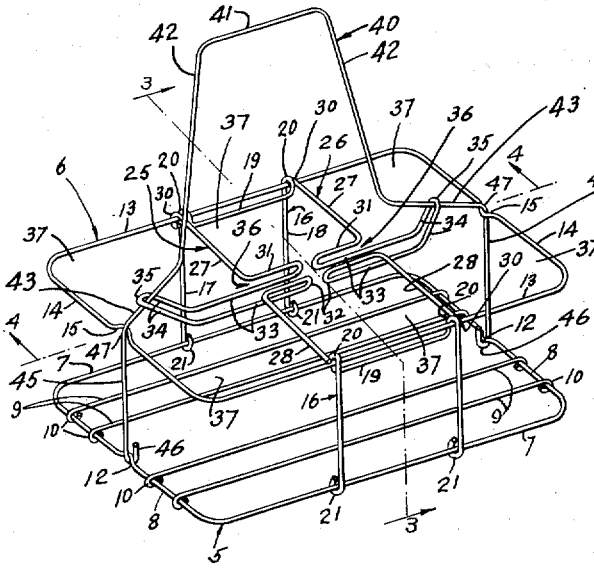
Fig. 1 is a perspective view of the improved wire rack or carrier.
Figure 3:
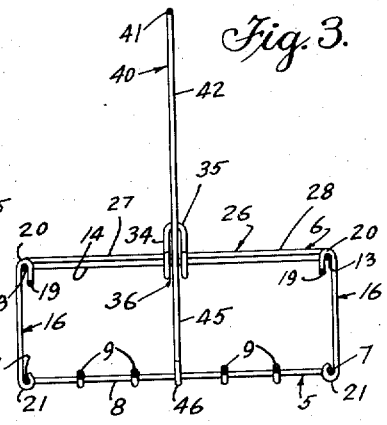
Fig. 3 is a cross-sectional view, taken on line 3—3 of Fig. 1.

Referring to the drawings in detail, the present improved rack or carrier is constructed entirely from wire and includes a rectangular bottom frame 5, which may be regarded as the base, and a rectangular top frame 6. The bottom frame 5 has side bars 7 and end bars 8, the ends of the single length of wire forming the frame being welded together. The frame 5 also is provided with longitudinal wires 9 which have loops 10 at their ends. These loops embrace the end bars 8 and are welded thereto. Intermediate their ends, the end bars 8 are provided with U-shaped bends 12 providing lower notches.

The top frame 6 has side bars 13 and end bars 14 which correspond to the side and end bars of the bottom frame, the end bars 14 also having U-shaped bends 15 located directly above the bends 12 and providing upper notches.

The rack or carrier also includes inverted U-shaped elements 16 having vertical legs or uprights 17 and 18 joined by horizontal cross-bars 19. At the junctures of the legs and cross-bar, the wire is formed into loops 20 which extend around the side bars 13 of the upper frame 6. The lower ends of the legs 17 and 18 are provided with loops 21 which encircle the side bars 7 of the bottom frame 5. It is to be noted at this point that the loops 20 and 21 are not welded to the side bars but rather loosely encircle the same to adapt the elements 16 to pivot relative thereto. Thus, by this means, it is possible to lower the top frame 6 against the bottom frame 5 with the elements 16 pivoting at the upper and lower ends to permit such lowering of the top frame. Due to the parallelogram effect, the top and bottom frames remain parallel at all times.

The top frame 6 is provided with wire cross members 25 and 26, each having arms 27 and 28 which extend transversely of the top frame. The ends of these arms are provided with loops 30 which encircle the side bars 13 to which they are welded. As shown, the arms 27 and 28 have right-angularly bent portions 31 which extend toward the longitudinal center of the top frame 6. The bent portions 31 are looped at their inner ends as indicated at 32 and are bent back upon themselves to provide parallel bars 33 which extend outwardly toward the ends 14. The outer end portions of the parallel bars 33 are inclined upwardly as shown at 34, the outer ends of the inclined portions being connected by a U bend 35. Due to the parallel, spaced relation of the portions 31 and 33 of the two cross members 25 and 26, there is provided a longitudinal slot or opening 36 along the median vertical plane of the top frame 6, said slot extending throughout nearly the full length of the top frame.

Due to the cross-like configuration of the wire elements 25 and 26, these parts, by reason of their arms 27, 28 and portions 31, 33, divide the rectangular area of the top frame 6 into six equal compartments 37. In these compartments 37 may be placed containers, for example milk bottles, with the bottles resting upon the support wires 9 of the bottom frame 5. Thus, the bottles are supported by the bottom frame and held in upright position by the side bars 13, end bars 14 and the various portions of the cross members 25, 26 forming part of the top frame.

The carrier is equipped with handle means by which it may be lifted and carried. This means consists of a substantially inverted U-shaped, wire handle or bail 40 having an upper horizontal cross-bar 41 adapted to be grasped in a hand. The ends of the bar 41 are bent downwardly in side portions 42 which diverge slightly. At a point substantially midway between the upper and lower ends of the handle 40, the side portions 42 diverge outwardly and downwardly to a greater extent in intermediate portions 43. These portions 43 extend through the U-bends 35 of the cross members 25 and 26 and merge into vertical legs 45. The lower extremities of the legs 45 are provided with U-shaped loops or hooks 46 which normally engage in the lower notches formed by the U-bends 12 in the end bars 8 of the bottom frame 5. It is also to be observed that the intersections of the portions 43 and legs 45 provide crotch portions 47 which, due to the resilient nature of the wire portions 42, 43, 45 and end bars 14, are adapted to snap into the U-bends or open notches 15 of the top frame. Due to the relatively close fit between the crotch portions 47 and loops 15, the handle structure 40 normally is held in a true erect position to serve as a lock in preventing pivotal movement of the upright wires 17, 18 and collapsing of the carrier.

Assuming that the carrier is in its normal extended position as described above and illustrated in Fig. 1, when the rack is to be employed for carrying milk bottles the rack containing empty milk bottles is brought to the dairy or store where the empty bottles are removed and replaced with full bottles of milk, these bottles being placed in the compartments 37 to be supported upon the bottom frame 5. The rack thus is used by the consumer in the same manner in which a conventional, rigid, wire rack is employed.

The racks or carriers are commonly loaned to the purchasers of the milk, a rack of full bottles being handed to the purchaser in return for a rack of empty bottles. In many instances, wire racks are sold by dairies to their customers. In either case, the dairy may have on hand a large number of the racks or carriers and storing the racks in a limited space is frequently a difficult problem. In order to conserve such space, the present invention provides a rack or carrier which is stackable so that any number of the racks may be placed one upon another in an orderly stack requiring minimum space.

Figure 4:
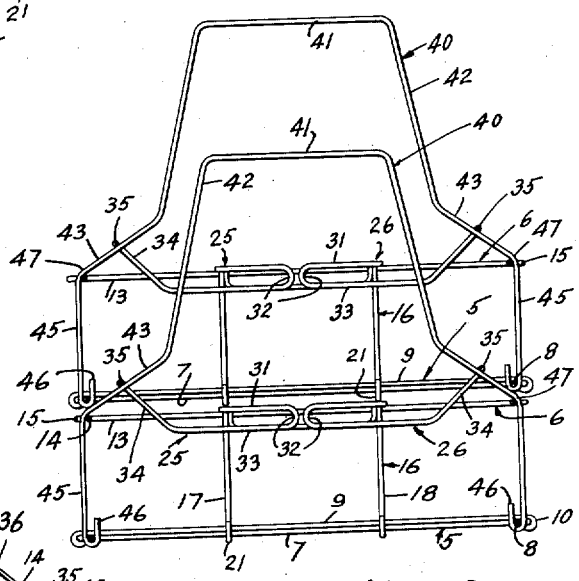
Fig. 4 is a longitudinal sectional view, taken on line 4—4 of Fig. 1 and illustrating the manner in which the wire rack may be stacked with similar racks.

Referring to Fig. 4, to stack two racks, one is placed upon the floor or other support and the second rack is then placed upon the first or lower rack with its bottom frame 5 resting upon the top frame 6 of the lower rack. During the placing of the second or upper rack, the handle or bail 40 of the lower rack is guided upwardly through the longitudinal slot or opening 36 occurring in the top frame 6 of the upper rack. Consequently, the handle 40 of the lower rack is caused to nest within the handle of the upper rack so that compact stacking of the racks or carriers is made possible and valuable space is conserved.

Figure 2:
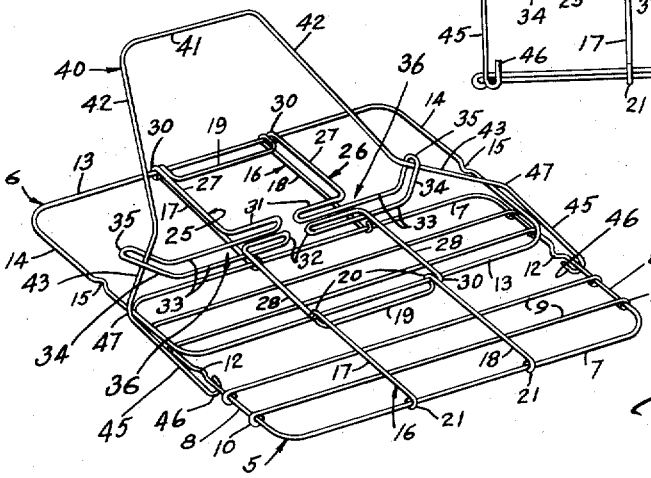
Fig. 2 is a perspective view of the rack in its collapsed condition.

In order to further conserve space in the manufacturer's shipping cartons and in the dairies or stores, each of the racks or carriers may be collapsed into the relatively flat condition illustrated in Fig. 2. To bring about this result, the end bars of the top and bottom frames 6 and 5 are sprung toward each other so as to disengage the loops 46 from the U-bends 12, the lower ends of the legs 45 then being displaced from the bends 12. Simultaneously, the crotch portions 47 are displaced laterally from the U-bends 15. Such disengagement unlocks the carrier so that the upright wires 17, 18 may pivot at their upper and lower ends to allow lowering of the top frame 6 against the bottom frame 5 as shown in Fig. 2. During such collapsing of the structure, the handle 40 remains connected to the top frame 6 by reason of the pivotal engagement of its sloping portions 43 in the loops 35.

Thus, by this specific construction the rack or carrier may be collapsed from the extended position shown in Fig. 1 to the flat form illustrated in Fig. 2 by simply unlocking the handle from the top and bottom frames and pivoting the top frame toward the bottom frame. With the carriers thus collapsed, they may be packed with compactness in shipping cartons and later stored in such flat condition in the dairy or store for future use. To condition the rack for use, the above procedure is reversed. That is to say, the upper frame 6 is swung upwardly into spaced relation to the bottom frame 5 with the wires 17 and 18 pivoting to allow this action. The loops or hooks 46 of the handle 40 are next engaged in the bends 12 of the bottom frame 5, after which the handle is pivoted transversely until its crotch portions snap into the U-bends 15 of the upper frame 6 to quickly lock the parts in the positions shown in Fig. 1.

It will be observed from the foregoing that the present invention provides a bottle rack or carrier which resembles a conventional wire bottle carrier and possesses the lightness, strength and rigidity of the same. The improved carrier is, however, more efficient and practical in that it may be conveniently stacked and collapsed when such is desired, thus making it possible to store a large number of the carriers in a small area, in a carton, in a dairy or store, or in a milk delivery truck. Moreover, the improved wire rack is economical to produce and may be sold at a price comparable to that of conventional racks.

In accordance with the provisions of the patent statutes, I have herein described the principle of the invention, together with the structure which I now consider to represent the best embodiment thereof. I wish to have it understood, however, that various modifications might be made in the structure within the spirit and scope of the invention as defined in the appended claims.

I claim as my invention:

1. A collapsible, wire, bottle carrier, comprising: a rectangular bottom, wire frame; a rectangular top wire frame normally positioned directly above said bottom frame; wire upright elements having their upper and lower ends pivotally connected respectively to said top and bottom frames and maintaining said frames in parallel relation, said top frame being adapted to be lowered against said bottom frame with said upright elements pivoting downwardly to allow such action, said top frame having cross members defining compartments for the bottles and also defining a longitudinal slot; and a handle having upright leg portions releasably engaging corresponding portions of said top and bottom frames, said handle having side portions extending upwardly through the end of said slot.

2. A collapsible, wire, bottle carrier, comprising: a rectangular bottom wire frame having side bars and end bars said end bars having U-bends intermediate their ends providing lower notches, said bottom frame having transverse wires upon which bottles can rest; a rectangular top wire frame having side bars and end bars, said top frame normally being positioned directly over said bottom frame and having U-bends in its end bars intermediate the ends thereof and providing upper notches; wire upright elements having their upper and lower ends pivotally connected respectively to the side bars of said top and bottom frames and operative to maintain said frames in parallel relation, said top frame being adapted to be lowered against said bottom frame in response to downward pivotal movement of said upright elements, said top frame having cross members dividing the area of the top frame into a plurality of compartments and having parallel portions defining between them a slot extending longitudinally of said top frame; and a wire handle of inverted U-shape having depending side portions extending through said slot adjacent the ends thereof, said sides having lower leg portions normally extending vertically between the ends bars of said top and bottom frames, the lower ends of said leg portions having hooks releasably engageable in the notches of the end bars of the bottom frame, upper portions of said leg portions being releasably engageable in said notches of said end bars of said top frame, engagement of said leg portions in said notches locking said top frame against collapsing movement toward said bottom frame but disengagement of said leg portions from all of said notches allowing pivotal movement of said upright elements so as to allow collapsing of the carrier structure with said top frame disposed flat against said bottom frame.

*3. A wire bottle carrier including a wire bottom frame open along a longitudinal center region thereof, a wire top frame positioned directly above said bottom frame, said top frame including side portions and end portions, wire upright elements connected respectively to said top and bottom frames for holding said frames in parallel spaced relation, a wire handle including leg portions engaging the end portions of said top frame, said top frame having cross members defining compartments for receiving bottles, and spaced longitudinal elements defining a longitudinal slot spaced directly above the open area of the bottom frame, the upper portions of said leg portions of the handle being spaced from one another a distance less than the longitudinal dimension of said open center region of the bottom frame and less than the longitudinal dimension of the slot defined by said longitudinal elements such that the upper portions of the leg portions of the handle of another similar wire bottle carrier located beneath said carrier can be extended upwardly through the open region of the lower frame and slot of the uppermost bottle carrier to permit compact stacking of the carriers upon one another.*

*4. A wire bottle carrier including a wire bottom frame open along a longitudinal center region thereof, a wire top frame positioned above said bottom frame, said bottom frame including side portions and end portions, wire upright elements connected respectively to said top and bottom frames for holding said frames in spaced relation, said top frame having cross members defining compartments for receiving bottles and spaced longitudinal elements defining a slot along the longitudinal center of said top frame vertically aligned with and spaced above the open area of the bottom frame, and a wire handle of inverted U-form engaging said end portions of the top frame and extending upwardly from the top frame coincident with the major axis of said slot, the upper portions of said wire handle being spaced inwardly of said top frame and being spaced apart a distance less than the longitudinal dimension of said open area and less than the longitudinal dimension of said slot.*

*5. A wire bottle carrier including a wire bottom frame having an open area, a wire top frame positioned above said bottom frame, wire upright elements connected respectively to said top and bottom frames for holding said frames in parallel spaced relation, said top frame including side and end portions and having cross members defining compartments for receiving bottles, and longitudinal elements defining therebetween a longitudinal slot spaced directly above the open area of the bottom frame, said bottom frame having longitudinal members defining bottoms for said compartments, the two innermost of each of said members being disposed on opposite sides of said slot so as to leave an unobstructed bottom entrance to the slot, and a wire handle including leg portions engaging the end portions of said top frame, the upper portions of said leg portions of the handle being spaced from one another a distance less than the longitudinal dimension of said slot and less than the distance between opposite end portions of the open area of the bottom frame.*

References Cited in the file of this patent or the original patent

UNITED STATES PATENTS

| | | |
|---|---|---|
| 1,283,389 | Wills et al. | Oct. 29, 1918 |
| 1,317,443 | Hildreth | Sept. 30, 1919 |
| 1,421,705 | Melish | July 4, 1922 |
| 1,548,549 | Pearce | Aug. 4, 1925 |
| 1,559,695 | Hatch | Nov. 3, 1925 |
| 1,861,368 | Sorrentino | May 31, 1932 |
| 2,101,487 | Anderson | Dec. 7, 1937 |
| 2,690,283 | Comploier | Sept. 28, 1954 |